Dec. 7, 1965  J. DICHTER  3,222,157
APPARATUS FOR THE MANUFACTURE OF AMPULES
Filed Jan. 3, 1962

United States Patent Office 3,222,157
Patented Dec. 7, 1965

3,222,157
APPARATUS FOR THE MANUFACTURE
OF AMPULES
Jakob Dichter, Sachsendamm 93, Berlin-Schoneberg,
Germany
Filed Jan. 3, 1962, Ser. No. 164,108
Claims priority, application Germany, Jan. 10, 1961,
D 35,138
7 Claims. (Cl. 65—280)

This invention relates to apparatus for the manufacture of ampules, and more particularly to apparatus for the formation of the bottoms of ampules after the ampules have been smelted off of a glass supply tube.

The invention is particularly adapted for use in an ampule machine of conventional construction in which a plurality of tube supporting chucks are rotated along a circular path past successive work stations at which various operations are performed on a glass supply tube supported in the chuck, with the end of the tube being worked projecting vertically downwardly from the chuck. An example of such a machine is shown in the United States Patent 2,935,819. In the conventional operation of an ampule machine of this general type, the hollow tube is, at one station, advanced to a burner at which the lower end of the tube is heated or smelted off so that the molten glass at the lower end of the tube merges to close the bottom of the tube. After the smelting off, the tube, while still soft, is advanced to a subsequent station at which a spring mounted pressure plate is urged upwardly against the bottom to flatten the bottom.

Due to normal manufacturing tolerances of the glass tubes, the wall thickness of these tubes varies substantially and frequently unevenly so that the wall may be thicker on one side of the tube than the other. Other variables in the manufacturing process, such as fluctuation in burner gas pressure, inaccurate burner settings, etc., combine with the dimensional variations of the tubes to frequently result in an unevenly formed or inclined bottom during the smelting off step. Application of the spring mounted pressure plate to compress unevenly or improperly smelted bottoms frequently results in the deflecting of the softened bottom laterally outwardly from the vertical tube axis or results in a greater axial compression of the tube wall on one side of the axis. The variables discussed briefly above resulted in a substantial number of deformed ampules.

It is a primary object of the present invention to provide apparatus for forming the bottoms of ampules in a manner in which irregularities arising during the smelting off step do not adversely affect the subsequent bottom formation.

It is another object of the invention to provide apparatus for forming the bottoms of glass ampules into a desired shape in a fashion such that irregularities arising during the smelting off operation are corrected.

Still another object of the invention is to form the bottom of a glass ampule into a shape having improved shatter resistant qualities.

In the achievement of the foregoing, and other objects, a bottom shaping element is supported to be urged axially upwardly against the smelted off bottom of a glass tube while the tube bottom is still soft. The bottom forming element is provided with an upwardly opening recess into which the bottom of the tube to be formed is adapted to project. The bottom of the forming recess, which is complementary to the bottom shape of the finally formed ampule, is not flat, but is convex upwardly so that the formed ampule bottom is shaped with an inwardly extending concave recess, similar to that frequently found in wine bottle bottoms.

Other objects and features of the invention will become apparent by reference to the following specification and to the drawings.

Figure 3:
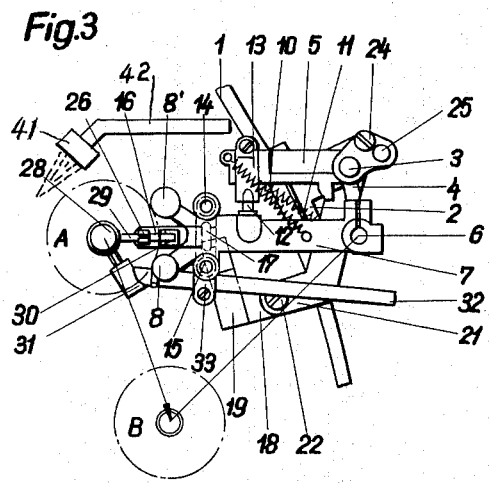
FIG. 3 is a top plan view of the bottom forming apparatus of FIG. 1.

Since the present invention is directed to ampule bottom forming apparatus, and since the ampule forming machine with which the present invention is to be employed is of well known construction, only a minimum of parts of the machine, apart from the bottom forming apparatus, are shown in the drawings. A typical machine includes a spider 40 mounted for rotation about a fixed vertical axis with a plurality of chucks 9 mounted at symmetrically spaced locations on the circumference of the spider for rotation therewith in a fixed horizontal circular path. At various points along the circular path traversed by the chucks during the rotation of the spider, various burners or tube working devices are mounted upon an annular burner ring 1 which is fixedly mounted upon the machine frame concentrically with the axis of rotation of the spider. The relationship between burner ring 1 and the path of chucks 9 is indicated in FIG. 3 of the drawings, the glass tube G which is being worked being supported vertically within the chuck and the tube following the indicated curved path passing through the successive chuck positions designated A and B in FIG. 3. A smelting off burner 41 located at the end of supply tube 42 adjacent position A smelts off the end of tube G as it moves along the curved path to position A.

The bottom forming apparatus of the present invention is mounted at a selected circumferential location upon burner ring 1 by a base member 2 which may be clamped to burner ring 1 by any suitable means, not shown. A vertical rod or shaft 3 is fixedly mounted in base member 2 and a rigid bridge member or crank arm 4 is supported upon shaft 3 at a location above burner ring 1 for rotation about the vertical axis of shaft 3.

At the upper end of shaft 3, a stop member 5 is received upon shaft 3 and projects laterally from shaft 3 generally toward the path of movement of chucks 9. Stop member 5 is held against rotation relative to shaft 3, while arm 4 is free to pivot about the axis of shaft 3.

At the end of arm 4 remote from shaft 3, a vertical pin 6 is located and pivotally supports a forked lever 7 which projects from pin 6 toward the path of movement of chucks 9. At the end of each of the forked arms of member 7, rollers 8, 8′, respectively are supported for rotation about respective vertical axes, the rollers 8 being vertically positioned to engage a circular flange upon the chuck assembly 9.

Lever 7 is supported for pivotal movement relative to the stationary portions of the apparatus about a fixed vertical axis, defined by the axis of shaft 3 and also about a second vertical axis defined by pin 6, the second axis defined by pin 6 being itself movable about the axis of shaft 3. To control the movement of the forked end of lever 7, two tension springs 10 and 11 are employed, tension spring 10 being connected between stop member 5 and lever 7, while tension spring 11 is connected between stop member 5 and arm 4. Springs 10 and 11 normally resiliently maintain the linkage defined by arm 4 and lever 7 in the position shown in FIG. 3, this position being defined by the engagement between a pin 12 and a recessed element 13 mounted on stop member 5.

A pair of spaced vertical guide bolts 14 and 15 are mounted upon forked lever 7 and project downwardly below the lever. A cross member 16 extends between and is slideably supported on guide bolts 14 and 15 for vertical movement which is induced by the engagement between a roller 17 mounted on member 16 and a stationary element 18 including an inclined cam portion 19. Cross member 16 is biased vertically downwardly against a stop at the lower end of member 14 by a compression spring 20 seated between the lower surface of forked lever 7 and the upper side of member 16.

Stationary member 18 is mounted upon a bracket 21 which is in turn supported from shaft 3. Member 18 is vertically adjustable upon bracket 21 by means of a set screw 22 received in the upper arm of bracket 21 and threadably engaged with member 18. Rotation of set screw 22 shifts member 18 vertically relative to bracket 21. Bracket 21 is in turn locked in position relative to burner ring 1 by an angle member 23 shown in FIG. 1. Vertical adjustment of roller 17 is accomplished by vertically adjusting lever 7, the vertical adjustment of lever 7 being accomplished by a second screw 24 mounted in member 5 which, when threaded into or out of base member 2 vertically shifts elements 4 and 5 on shaft 3. To rotatably lock stop member 5 against rotation about shaft 3, a vertical pin 25 is eccentrically mounted in member 5 and is loosely received within a bore formed in member 2.

Figure 1:
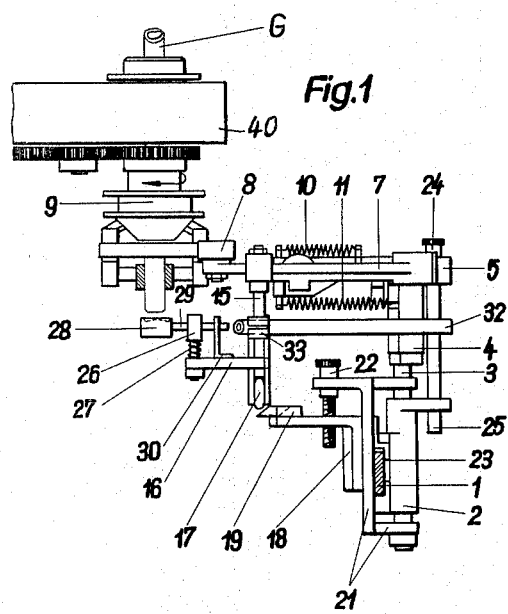
FIG. 1 is a side elevational view of a bottom forming apparatus embodying the invention, showing the relationship between the bottom forming apparatus and portions of cooperating structure of an otherwise conventional ampule making machine.

As best seen in FIG. 1, guide member 16 projects from roller 17 toward the main machine axis. At the inner end of member 16, a bolt 26 is slideably reecived in member 16 and is normally biased upwardly to a limit determined by the engagement between a nut at the lower end of the bolt and member 16 by a compression spring 27 seated between the bolt head and member 16. The bottom shaper 28, which will be discussed in more detail below, is supported upon bolt 26 by means of a pin 29 which passes through a suitably located bore in the head of bolt 26. The inner end of rod 29 is received between a pair of angles 30 so that shaper 28 can move upwardly and downwardly freely relative to member 16 while elements 30 prevent rotation of shaper 28 about the axis of bolt 26.

Figure 2:
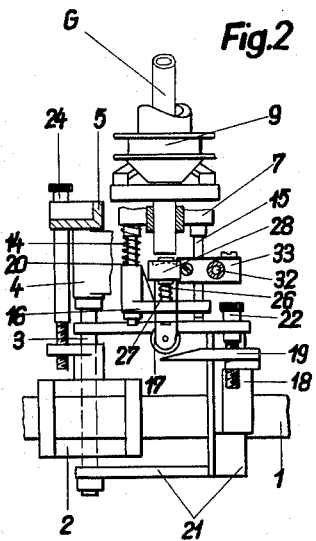
FIG. 2 is an end elevational view, partially in section, and with certain parts broken away, of the structure of FIG. 1.

To maintain bottom shaper 28 at the desired temperature, a burner 31 located at the end of a supply tube 32 is located adjacent shaper 28. Burner tube 32 may be conveniently supported from guide rod 15 by a suitable bracket 33 (see FIG. 2).

Figure 4:
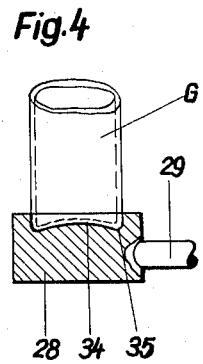
FIG. 4 is a detailed view, partially in section, of the bottom shaping element of the structure of FIG. 1.

Referring now particularly to FIG. 4, it is seen that shaper 28 is formed with an upwardly opening recess which is adapted to receive the molten smelted off bottom of a tube G. The tube receiving recess is formed with a convex camber as at 34 so that shaper 28 forms the softened bottom of tube G into an externally concave shape. The junctures between the convex bottom 34 of he recess and the vertical recess sidewalls are rounded as at 35 to merge smoothly with bottom 34.

The operation of the bottom shaping apparatus is as follows. The apparatus is initially positioned as shown in FIG. 3 by tension springs 10 and 11. At this time, roller 17 is disengaged from the inclined cam 19. A chuck 9 supporting a glass tube having a bottom which has previously been smelted off by burner 41 is rotated in a clockwise direction toward the chuck position indicated at A in FIG. 3 and, at position A the chuck flange, shown in broken line in FIG. 3, moves into engagement with rollers 8 and 8'. At the moment of engagement illustrated at position A, shaper 28 is centered below the vertical axis of the tube supported in the chuck and, as best seen in FIG. 1, the forward end of the tube is spaced above shaper 28.

The characteristics of the machine are such that the chucks are continuously rotated along the circular path, a portion of which is indicated by the curved line connecting the centers of positions A and B in FIG. 3. In order for shaper 28 to form the bottom of the tube as desired, it is necessary that shaper 28 be accurately maintained on the curved path traversed by the soft end of the glass tube being formed throughout the entire period of movement of the chuck from position A to B. The desired vertical registry of the shaper 28 and tube G is achieved by the linkage consisting of forked lever 7 and arm 4 and their respective pivotal supports. Rollers 8 and 8', during the movement of the chuck from position A to B remain in engagement with the circular periphery of the chuck flange, the rollers being able to move circumferentially about the periphery of the flange as required. Tension spring 10 and tension spring 11 respectively resist motion imparted to lever 7 and arm 4, thus maintaining both rollers 8 and 8' in engagement with the periphery of the circular flange on chuck 9. This action in turn maintains shaper 28 centrally aligned with the vertical axis of the tube supported by the chuck. As the chuck advances from position A to position B, the interference between the chuck flange and roller 8 carries forked lever 7 along with the chuck until, as the chuck reaches position B, the geometry becomes such that roller 8 can roll clear of the chuck flange. Pivotal movement of lever 7 and arm 4 about pin 6 and shaft 3, resisted by springs 10 and 11, permits the lever to accommodate itself to the motion of the chuck flange during movement from A to B. The constrained movement of lever 7 during movement of the chuck from A to B causes roller 17 to be carried along the inclined surface of cam 19, and this action lifts cross member 16, and thus shaper 28 upwardly into engagement with the soft bottom of the glass tube to compress the bottom into the form shown in FIG. 4.

Figure 5:
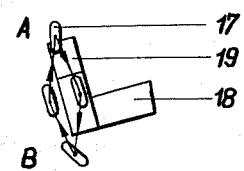
FIG. 5 is a partial top plan view of a portion of the structure of FIG. 1, showing the path followed by one element of the bottom forming apparatus during the bottom forming operation.

The constrained movement of lever 7 by the engagement between the chuck flange and rollers 8 and 8' causes roller 17 to follow the path indicated in FIG. 5 as the chuck moves from A to B. As indicated by the directional arrows in FIG. 5, during the swinging movement of lever 7 away from the position shown in FIG. 3, roller 17 follows a path such that it is engaged with cam 19. On the return movement, which starts when roller 8 finally becomes disengaged from the chuck flange periphery when the chuck reaches position B, motion of the forked end of lever 7 is no longer constrained by the chuck assembly, and thus springs 10 and 11 can return the linkage consisting of arm 4 and lever 7 to its rest position of FIG. 3 in the most expeditious manner. The release of the constrainment of chuck flange from the forked end of lever 7 permits springs 10 and 11 to drive roller 17 back to its initial position along a path, which as shown in FIG. 5 passes clear of the surface of cam 19.

While I have described but one embodiment of my invention, it will be apparent to those skilled in the art that the disclosed embodiment may be modified. Therefore, the foregoing description is to be considered exemplary rather than limiting and the true scope of the invention is that defined in the following claims.

I claim:

1. In an ampule making machine having a chuck adapted to support the glass tube in a vertical position with the lower end of the tube projecting downwardly below said chuck, smelting off means, bottom forming means adjacent said smelting off means, and means for driving said chuck along a fixed horizontal path past said smelting off means and said bottom forming means to successively advance the lower end of a tube supported in said chuck into operative relationship with said smelting off means and said bottom forming means; the improvement wherein said bottom forming means comprises a bottom shaping member having an upwardly opening recess adapted to receive the smelted off end of a tube in seated relationship therein, support means on said forming means supporting said shaping member for horizontal movement to and from a normal rest position located adjacent said smelting off means, means effecting vertical movement to said shaping member during said horizontal movement, said support means including arm means positioned to be engaged and moved by said chuck for moving said shaping member horizontally from said rest position with said chuck during movement of said chuck along a portion of said horizontal path, said chuck engaging means being operable to maintain said recess in vertical registry with the smelted off end of a tube carried by said chuck from said smelting off means along said portion of said path, said means effecting vertical movement to said shaping member including cam means positioned relative to said portion of said path to engage cam follower means on said support means during horizontal movement of said shaping member with said chuck for elevating said shaping member to seat the smelted off end of the chuck supported tube within said recess and for lowering said shaping member out of engagement with said tube before said chuck arrives at the end of said portion of said path remote from said smelting off means, and means for returning said shaping member to its rest position upon movement of said chuck beyond said remote end of said portion of said path.

2. In an ampule making machine as defined in claim 1, the further improvement wherein the bottom of said recess in said bottom shaping member is of upwardly convex form whereby said bottom shaping member is operable to form an upwardly concave depression in the bottom of a smelted off tube.

3. In an ampule making machine as defined in claim 2, the further improvement wherein said recess is formed with vertically extending sidewalls which curve smoothly inwardly at their lower ends to merge with the convex bottom of said recess.

4. In an ampule making machine as defined in claim 2, wherein said means for driving said chuck along a fixed horizontal path comprise a member rotatable about a vertical axis horizontally spaced from said chuck whereby said chuck is carried along a circular path; the further improvement wherein said chuck engaging means comprises a crank mounted for rotation about a fixed vertical axis spaced outwardly from said curved path, a lever member pivotally supported at one end upon said crank for movement about a second vertical axis spaced from said fixed vertical axis, and means on the opposite end of said lever member engageable with said chuck to maintain said recess in vertical registry with a tube in said chuck by swinging said lever and said crank about said fixed and said second vertical axis.

5. In an ampule making machine as defined in claim 4 wherein said chuck includes a circular flange concentric with the axis of the tube supported therein; the further improvement wherein said means on said opposite end of said lever comprises a pair of spaced rollers mounted on said lever for rotation about vertical axes symmetrically disposed with respect to said recess.

6. In an ampule making machine as defined in claim 5; the further improvement wherein said means for returning said shaping member to its rest position comprises first spring means resiliently biasing said lever about said second vertical axis toward said rest position, and second spring means resiliently biasing said crank about said fixed vertical axis toward said rest position.

7. In an ampule making machine as defined in claim 6; the further improvement wherein said means supporting said shaping member for horizontal and vertical movement further comprises means for vertically adjusting said shaping member relative to said means for elevating said shaping member.

References Cited by the Examiner

UNITED STATES PATENTS 2,935,819    5/1960    Dichter _____ 65—280 X

FOREIGN PATENTS 1,170,458    9/1958    France.
708,455    7/1941    Germany.

DONALL H. SYLVESTER, *Primary Examiner.*